Aug. 22, 1939.  G. T. RONK  2,170,095
TRUCK
Filed March 4, 1935  2 Sheets-Sheet 1
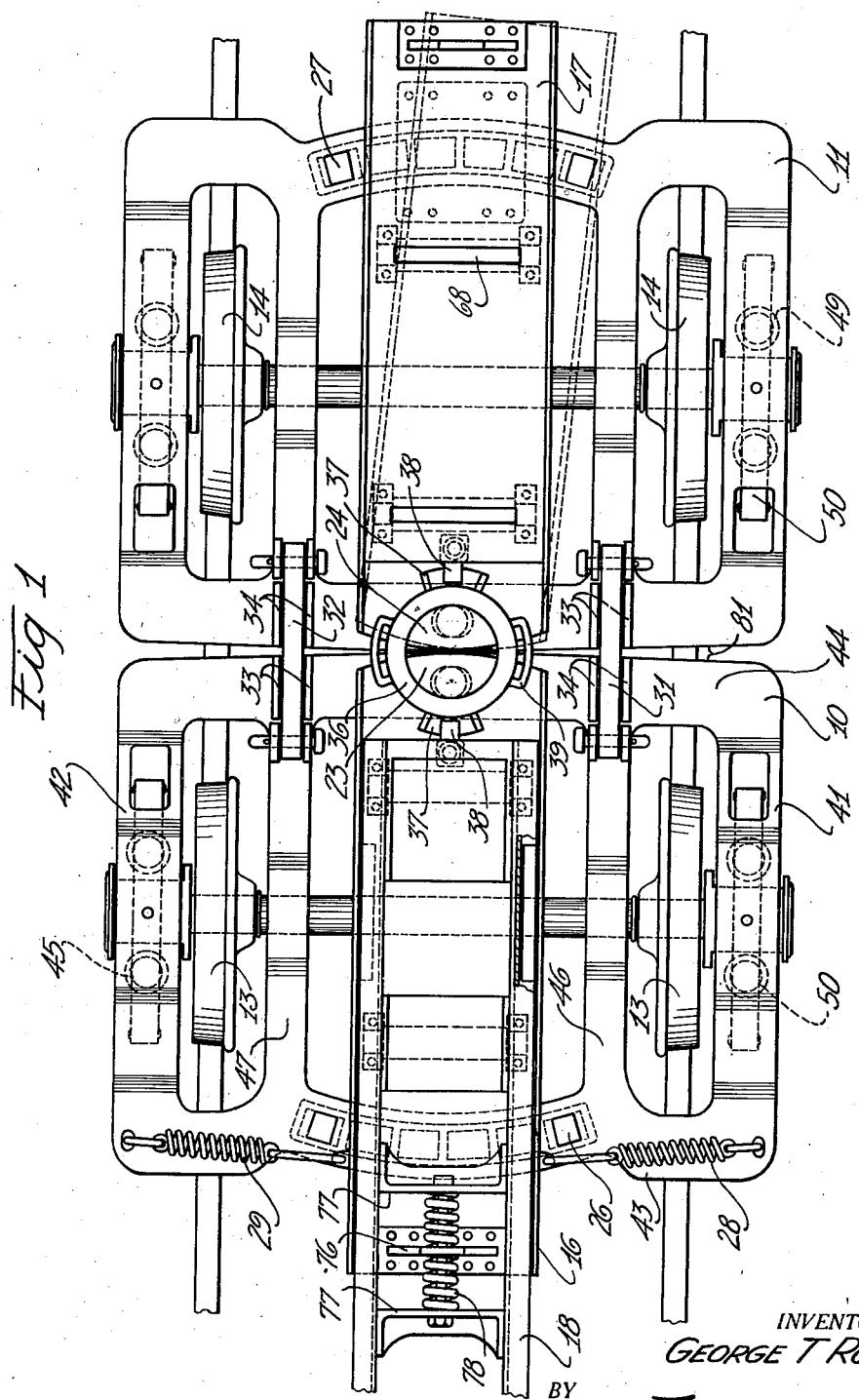
INVENTOR.
GEORGE T RONK
BY
Flournoy Corey
ATTORNEY.

Aug. 22, 1939.  G. T. RONK  2,170,095
TRUCK
Filed March 4, 1935   2 Sheets-Sheet 2
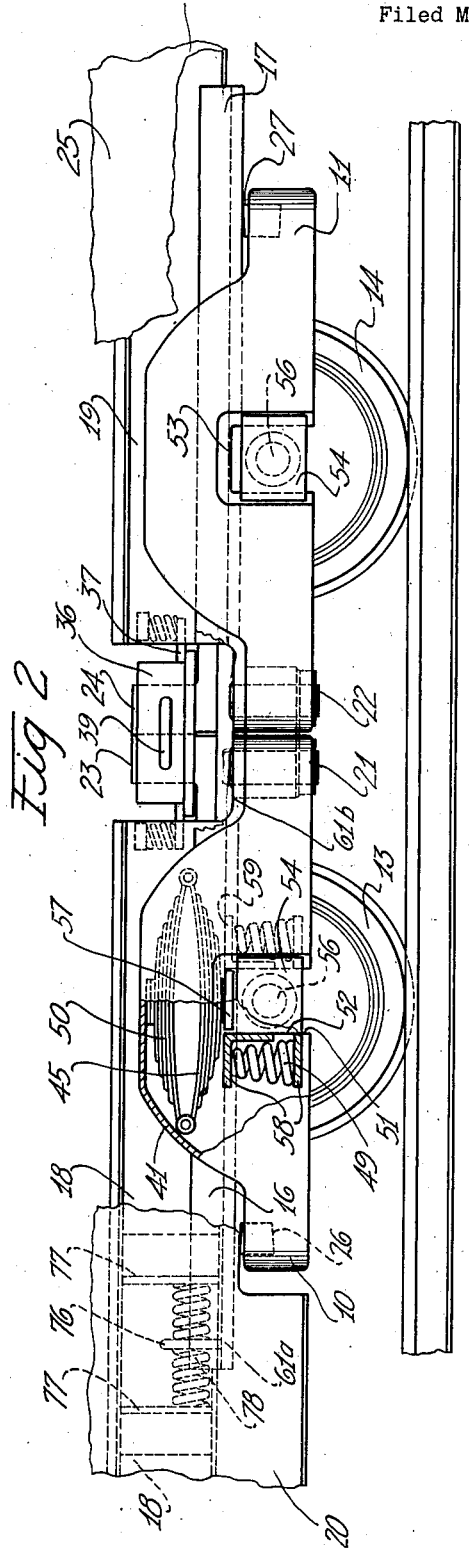
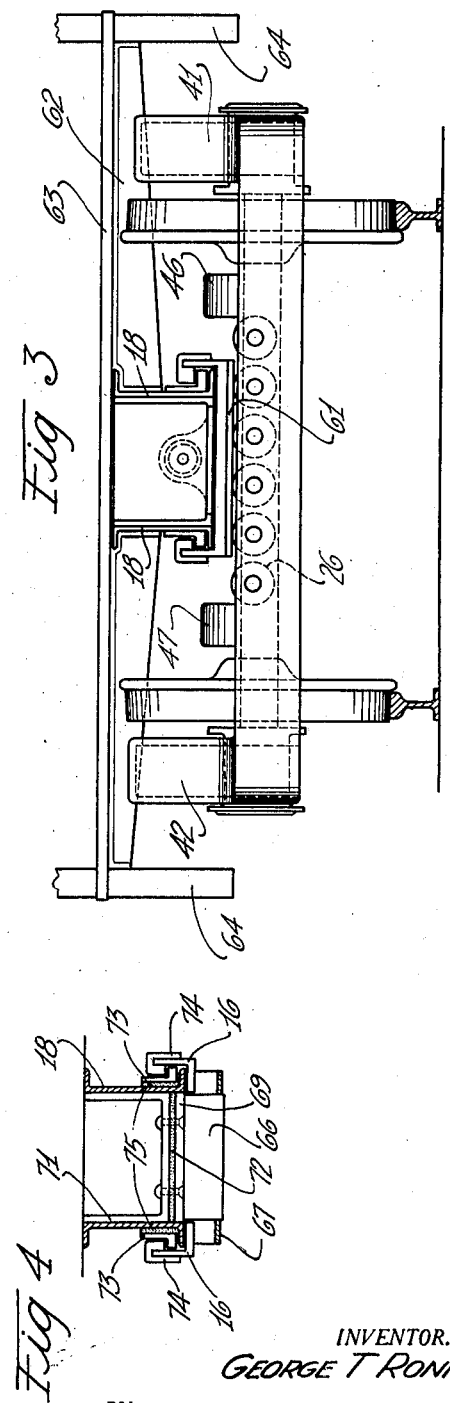
INVENTOR.
GEORGE T RONK
BY
Flournoy Corey
ATTORNEY.

Patented Aug. 22, 1939

2,170,095

UNITED STATES PATENT OFFICE 2,170,095

TRUCK

George T. Ronk, Lanark, Ill.

Application March 4, 1935, Serial No. 9,135

19 Claims. (Cl. 105—4)

This invention relates to railway train trucks and especially to that type of trains and truck mounting therefor known as the articulated type in which the adjacent ends of two cars are pivotally mounted on the same truck.

This method of coupling cars has a distinct advantage over older methods. The former resilient style of coupling, using separate trucks spaced same distance apart, allows a violent relative oscillation of adjacent cars on curves, which, coupled with high center of gravity and centrifugal force, prevents operating such trains at extremely high speeds.

In the present state of the art these difficulties are avoided by articulating the cars without resiliency and pivoting adjacent ends over a common truck. Due to great increase of power in prime movers this is possible in light trains which do not require undulating starting movement. It will be seen that the articulated train moving around a curve will tend to stabilize surging and avoid oscillation as between adjacent cars, allowing higher speeds with safety.

Articulated trains, as now used, have had one serious objection. Inasmuch as the cars are pivotally mounted on a common truck there is no way to separate the cars for switching except with heavy shop equipment, as the ends of the cars must be hoisted off the common pivoted truck and there is then no means of furnishing traction during the switching operation except some overhead carrying means such as a traveling crane.

Moreover, it is extremely desirable to maintain a standard operating practice which provides for lengthening and shortening trains at junction and division points; and for interline and intersystem exchange of cars, especially on transcontinental trains.

It is an object of this invention to provide an articulated railway truck for articulated trains, which will permit said trains to be disconnected and switched at will, and which may be adapted to non-resilient coupling or to varying degrees of resiliency in coupling, dependent on the operative purpose as well as the weight and speed of the train.

It is a further purpose to provide a truck which is separable, one segment to remain under the end of each disconnected car, to furnish a rolling support for switching purposes, and to support said cars in a practical and operable manner.

It is a further purpose to provide for pivoting the segments of the truck near the extreme ends of its supported car, in such a manner that the supporting wheels will follow switch curves and right themselves again on a straight track during switching operations.

It is a further purpose to provide for uniting the said truck segments into an integral truck, near the approximate line of articulation of the said car sills, with whatever degree of rigidity operating conditions demand; and to provide against the oscillation of truck segments relative to each other.

It is a further purpose to provide a compound articulation of the truck segments and the adjacent connected cars, on an approximately common vertical pivotal line, and to provide for a working variation from that line.

It is a further purpose to provide articulation for car center sills, maintaining said sills free from relative oscillation, said articulation to be effected over the pivotal center to said integrated and articulated truck, on contact of the articulating elements of adjacent cars, without hoisting and lowering of said cars.

It is a further purpose to provide an intermediate sill member, between the car center sill and the car truck, to replace the traditional bolster construction, and to supplant the customary direct connection of the car center sill and bolster to the truck bolster king pin.

It is a further purpose to provide stabilizing elements, associated with said intermediate sill member to maintain an approximately fixed relation between the plane of the truck top and the plane of the supported car floor.

It is a further purpose to provide non-metal, cushioning elements between said intermediate sill member and the car sill proper, to minimize communication of metal rail vibrations to the supported car.

It is a further purpose to provide for the longitudinal oscillation of the car truck with respect to the said vertical pivotal line, to provide a cushion against track and braking shocks; and to provide for adaptation to resilient types of coupling when desired.

It is a further purpose to provide for the limited central pivoting of said integrated truck, relative to the supported cars, to meet arcuate track conditions and to provide non-friction means for carrying the weight of said cars in their varying pivotal or oscillating positions with regard to said truck.

It is a further purpose to provide for carrying the weight of said supported cars, both at the pivotal center of said integrated truck, and at points equidistant from, and beyond, the said truck axles, with the two-fold object of providing stability for the truck segments when separated and neutralizing the evils of spring harmonics.

It is a further purpose to provide a novel wheel mounting for an inharmonic spring assembly with the objects of allowing working clearance for low center of gravity car sills and said articulating elements and further insuring stability of attachment of said articulating elements by virtue of the "individual action" of individual wheel mounting and the neutralizing office of said inharmonic spring combination.

It is a further purpose to provide a single principal segment casting of inexpensive design and of symmetrical, semi-truck dimensions, adaptable for either end of said truck, capable of sustaining high speed stresses, with the object of avoiding the danger of traditional multiple part truck assemblies when operated at excessive speeds and to further provide a sustaining housing for said spring assemblies integral with said casting.

There are other purposes and objects, not separately set forth, which will be obvious to one skilled in the art from the specification and drawings.

In the drawings:

Figure 1 is a plan view of an embodiment of my invention.

Figure 2 is a side elevational view.

Figure 3 is an end elevation view; and

Figure 4 is a view in section of a car sill constructed according to my invention.

In practice, my invention provides a pair of segmental truck members 10 and 11, each of which truck members have means for rotatably mounting pairs of wheels 13 and 14 therein. These truck segments are pivotally engaged to the underside of longitudinally shiftable sill plates 16 and 17 which support sills 18 and 19 of the adjacent cars 20 and 25, by means of pins 21 and 22, and the truck segments pivot about on these pins both in the connected and disconnected relation of these cars. The sills 18 and 19 of the adjacent cars are preferably connected to each other by means of a segmental king pin having the king pin segments 23 and 24. This king pin connection is independent of the pivotal connection of the truck segments, providing a certain stability of train line of draft unaffected by a limited shuttling and oscillation of the integrated truck due to track conditions, but obviously, the pivots and king pin pivots must be so disposed, arranged and constructed that they work together to secure the desired results.

Inasmuch as the truck segments 10 and 11 must pivot about on the pins 21 and 22 it is apparent that some means must be provided at points on the truck segments opposite to the pivot pins to afford stability to the truck segment by bearing a portion of the car weight. Such support is afforded by means of rollers 26 and 27 in the truck segments, which are adapted to bear against the under side of the sill plates 16 and 17. The under sides of the sill plates 16 and 17 are provided with a wear plate 61.

It is desirable, in this embodiment of the invention, that means be provided to resiliently urge the truck segments 10 and 11 to a normally centered or aligned central position after being displaced by arcuate track conditions. One means for accomplishing this result is the spring means indicated at 28 and 29. These springs are connected, as shown, to the sills and to the truck segments.

The truck segments may be detachably engaged to one another by any desirable means but it is preferable that some relative vertical movement between the segments be permitted. On the other hand any lateral or relative horizontal movement should be prevented. One means of accomplishing this result is afforded by the links 31 and 32 which are pivotally engaged to the truck segments 10 and 11 so that the truck segments may move vertically to a limited degree but such that any relative horizontal or lateral movement is prevented by the lugs 33 and 34 on the respective truck segments which confine the links.

Coupling of the sills of the cars, through coupling of the king pin segments 23 and 24, is accomplished by a heavy surrounding ring 36, which we may term the king pin ring. This ring may be placed over the segments 23 and 24 and locked in place by means of ears 37 on the ring and latches 38 on the sills. Handles 39 are also provided in order that the trainmen may lift the ring by hand.

It is apparent from the foregoing description that I have provided a truck structure such that the cars may be disconnected one from the other and the truck segments will still support the cars and will operate as independent units to swivel about to accommodate the truck to the curves and inequalities in the track, yet, when the truck segments are connected together, they act as a single pivotal unit which will also swivel about to permit the integrated truck to accommodate itself to curves and inequalities of the track. In other words I have provided a truck which may be divided into operable segments which will still function as did the original complete unit.

In the broad aspect of the invention the foregoing is a statement in general of the structure and operation of a device constructed according to my invention. I have found however that there are certain advantages to be derived from the specific structure which I am about to describe.

The truck segments are preferably rectangular in plan view and preferably a single casting comprised of side members 41 and 42, end members 43 and 44 and connecting or bracing members 46 and 47 arched for axle clearance. The side members 41 and 42 are hollow and arched in order that elliptic springs 45 and 50 and coiled spiral-helical springs 49 may be received within the side members 41 and 42. The side members 41 and 42 are cut away as indicated at 51 and are provided with side walls 52 and upper walls 53 in order that bearing blocks 54 for the axle 56 may be received in the recesses so formed. The central portions of the elliptic springs 50 are secured to the under side of the uppermost portions of the side members 41 and 42 and the lower springs 45 are provided with rolling pads 57 adapted to be engaged on the bearing blocks 54. The side members 41 and 42 are provided with ears 59 projecting inwardly from the side walls 52 and are adapted to receive the upper ends of the coiled spiral-helical springs 49. The lower ends of the bearing blocks 54 are provided with outwardly horizontally extending ears 58 adapted to receive the lower ends of the springs 49. It is now apparent that the elliptic and coil springs work in parallel relation with each other and it has been found that the combination of elliptic and coiled springs, with the coiled springs wound in spiral-helical form, is of marked assistance in breaking up any tendency toward harmonic movement of the trucks on the wheels and consequent harmonic flexing of the springs, which harmonic flexing has been found to cause surging and rough riding.

It is evident also that this clustering of springs, leaves the center of the truck free for low hung car sills and provides individual wheel spring, producing the cushioning effect known as "knee action".

The end portion 43 of the truck 10 is provided with a curved section adapted for mounting the rollers 26 therein and the rollers roll on the underside of wear plates 61 which are firmly attached to the sill plates 16 and 17. The sill plates 16 and 17 are channel shaped (Figures 3 and 4) and extend from a point well inside the end portion 43 of the truck 10, as indicated at 61a, to a position at the outermost end 44 of the truck 10, as indicated at 61b. The pins 21 and 22 are engaged to the centers of the end portions 44 of the trucks 10 and 11 and to the ends of the sill plates 16 and 17. The openings for the pins 21 and 22 are elongated in an arc to permit the truck to pivot substantially about the axis of the king pin when the segments are coupled together.

The sills 18 and 19 are comprised of heavy channels arranged to form a box section (Figure 3), and cross supports 62, for supporting the floor 63 of the car 10, are arranged to engage the sills. The sides 64 of the cars preferably extend down almost to the center line of the wheels for streamlining.

In this embodiment of the invention the sill plates 16 and 17 are made longitudinally shiftable with reference to the sills 18 and 19 for permitting the truck segments and integrated truck to shift longitudinally to a limited degree with respect to the sills and the cars they support. A preferred means of securing this result is to provide transversely extending rollers 66 which are mounted for rotation in brackets 67 which are, in turn, secured to the underside of sill plates 16 and 17. The rollers 66 project through rectangular openings 68 in the sill plates 16 and 17 and are so located that they roll upon contact plates 69. The contact plates 69 are secured to spacer castings 71 which in turn are welded or otherwise secured to channels or sills 18. A layer of fibrous material 72 is preferably disposed between the contact plates 69 and spacer castings 71 to absorb shock and vibration.

In order to prevent the sills 18 and 19 from being displaced from the sill plates 16 and 17 I preferably employ angle iron slides 73 on the outside faces of the sills 18 and 19 and replaceable wear slides 74 on the upper edges of the upturned portions of the sill plates 16 and 17. The wear slides 74 project inwardly from the sill plates over the slides 73 and thus prevent the sills from being displaced. I preferably dispose strips 75 of fibrous material between the slides 73 and sills 18 and 19 to absorb shock and vibration.

The sill plates 16 and 17 are provided with vertically extending ears 76 at the innermost end portions 61a and these ears extend upwardly into the spaces between the vertical channels which constitute the sills 18. Partitions 77 are provided within the sills, one on either side of the ears 76, and springs 78 are engaged between the ears 76 and the partitions 77. The sills 18 and 19 may roll on rollers 66 on the bottom of the sill plates 16 and 17 to a degree limited by the springs 78. It is apparent that the springs 78 will permit the truck segments and integrated trucks to move longitudinally with respect to the cars 20 and 25 and in this manner some longitudinal movement of the trucks and truck segments with respect to the cars may be had for cushioning shocks due to braking and track unevenness.

The adjacent sides 44 of the truck segments 10 and 11 are preferably slightly beveled, as indicated at 81, to permit some slight rocking movement of the trucks with respect to each other, if desired, for limited dirigibility of wheeling. The king pin segments 23 and 24 are rounded, as indicated in Figure 1, to permit the cars to rotate the king pin segments to a limited degree while the train goes around the curve. The dotted lines of Figure 1 indicate the position of the sill-plate 17 and sill 19 as the train rounds a curve.

The preferred structure just described may be termed a "semi-resilient" truck since longitudinal movement of the integrated truck relative to the car sills is afforded and since there is some slight rocking movement of one truck segment on the other.

In another construction I may fasten the sill plates 16 and 17 solidly to the sills 18 and 19 and this structure may be termed a "non-resilient" truck. I may provide means for bolting the two truck segments together solidly to prevent any relative movement of the truck halves whatsoever, while they are connected in a single unit.

In another construction I may provide a draw bar of the usual pin and knuckle type instead of the king pin type of connection shown and described, and this draw bar may be resiliently engaged to the sills 18 in accordance with the usual practice. This I call a full-resilient type, as the car may assume relative contact positions by virtue of springs 78 while the integrated truck may still shuttle independently as in the semi-resilient type. These and other modifications may be made by those skilled in the art without departing from the spirit and scope of my invention as set forth in the appended claims.

It may be readily understood that a truck constructed according to my invention provides for compound articulation of the truck segments in that each of the truck segments pivots about its own pivot pin and that, because of the slotted connecion of the pivot pins in the truck segments, the truck as a whole substantially pivots about a common vertical axis passing through the axis of the king pin.

Herein it will be seen that I have invented a novel railway truck for articulated trains, which will permit of extremely high speeds, by virtue of low center of gravity, freedom from relative oscillation on curves, freedom from spring surging, freedom from truck vibration and braking shocks, freedom from the danger inherent in multiple parts; and also by virtue of flexible but closely fitted attachments and co-ordinating elements; and which, at the same time, will permit of standard switching and car interchange operations.

I claim as my invention:

1. In a truck for the cars of an articulated type train, two truck segments each pivotally attached to its respective car means for securing the cars together, and separate means for securing the segments together to form a single truck with a single operative pivotal center, the first named means being adjacent the last named means.

2. A truck for the cars of an articulated train including sills extending longitudinally beneath the cars, sill plates cooperatively engaged to the under face of the sills, truck segments pivotally engaged to the sill plates near the ends of the cars, means for slidingly supporting the sills on the sill plates, coupling means for coupling the sills and means for coupling the truck segments together to form a single truck.

3. A truck for the adjacent cars of an articulated train including sills extending longitudinally beneath the cars, sill plates cooperatively engaged to the under faces of the sills, truck segments pivotally engaged to the sill plates near the ends of the cars, means for permitting longitudinal movement of the truck segments with respect to the sills, coupling means for coupling the sills and means for coupling the truck segments together to form a single truck whereby said truck will assume an integrated pivotal relation to said adjacent supported cars.

4. In a car structure, a sill beneath the car, a sill plate engaged to the under faces of the sill in such a manner that it will permit longitudinal movement with respect thereto but will prohibit transverse movement therebetween, a truck segment of a two part truck pivotally engaged to the sill plate and having means thereon for engaging the sill plate to permit transverse movement of the truck segment with respect to the sill plate, and resilient means for limiting transverse pivotal movement of the truck segment with respect to the car sill.

5. In a car structure, a sill beneath the car, a sill plate engaged to the under faces of the sill for longitudinal movement with respect thereto, a truck segment pivotally engaged to the sill plate and having means thereon for engaging the sill plate to permit transverse movement of the truck segment with respect to the sill plate, resilient means for limiting transverse pivotal movement of the truck segment with respect to the car sill, and other resilient means for limiting longitudinal movement of the sill plate with respect to the sill.

6. In a truck for articulated cars, a pair of truck segments, means for pivotally engaging the truck segments to the adjacent ends of two cars, and means for connecting the adjacent ends of the two cars, the axes of the car connecting means and the means for pivotally engaging the truck segments to the ends of the cars being substantially in the same vertical line.

7. In a truck for articulated cars, a pair of truck segments, means for pivotally engaging the truck segments to the adjacent ends of two cars, means for connecting the adjacent ends of the two cars, the axes of the car connecting means and the means for pivotally engaging the truck segments to the ends of the cars being substantially in the same vertical line, and means at the pivotal connections of the truck segments for permitting a working variation from the vertical line.

8. A means for supporting and connecting the adjacent ends of two cars of a train including a sill on each of the cars for supporting them, a sill plate beneath each of the sills, a resilient means for connecting the sill and sill plate, a truck segment pivotally connected to each of the sill plates, each truck segment having at least one pair of wheels rotatably mounted therein, means for removably connecting the truck segments together to form a single truck and means for connecting the adjacent ends of the sill plates.

9. A means for supporting and connecting the adjacent ends of two cars comprising connecting means for connecting the cars and a truck comprised of two segments, means for connecting the segments to form a single truck, pivotal connections for connecting the truck segments to the respective cars, and means for permitting the truck segments and truck segment pivots to pivot about a common vertical axis passing substantially through the car connecting means.

10. A means for supporting the adjacent ends of two cars in articulated relationship comprising sills on each of the cars for supporting them, sill plates one on the under side of each of the sills, truck segments engaged to each other pivotally connected to the sill plates, and means for affording limited longitudinal movement between the sill plates and the sills.

11. A means for supporting the adjacent ends of two cars in articulated relationship comprising sills on each of the cars for supporting them, sill plates one on the under side of each of the sills, truck segments engaged to each other pivotally connected to the sill plates, and means for affording limited longitudinal movement between the sill plates and the sills comprising rollers rotatably mounted in the sill plates and said rollers being disposed to support the sills thereon for the aforementioned longitudinal movement.

12. A means for supporting the adjacent ends of two cars in articulated relationship comprising sills on each of the cars for supporting them, sill plates one on the under side of each of the sills, truck segments engaged to each other pivotally connected to the sill plates, means for affording limited longitudinal movement between the sill plates and the sills comprising rollers rotatably mounted in the sill plates, said rollers being disposed to support the sills thereon for aforementioned longitudinal movement, and resilient means for limiting the longitudinal movement of the sill plates with respect to the sills.

13. A means for supporting the adjacent ends of two cars in articulated relationship comprising sills on each of the cars for supporting them, sill plates, one on the under side of each of the sills, truck segments engaged to each other pivotally connected to the sill plates, means for affording limited longitudinal movement between the sill plates and the sills comprising rollers rotatably mounted in the sill plates, said rollers being disposed to support the sills thereon for said longitudinal movement, and resilient means for limiting the longitudinal movement of the sill plates with respect to the sills comprising an ear on each of the sill plates, partitions in the sills and springs between the ears and the partitions.

14. A means for supporting a car including a sill beneath the car, a sill plate disposed for longitudinal movement beneath the sill, rollers between the plate and sill to permit said longitudinal movement of the sill with respect to the plate, resilient means for limiting movement of the plate with respect to the sill, a truck segment pivotally engaged to the sill plate at one end of the truck segment, and rollers in the other end of the truck segment adapted to roll on the under side of the sill plate to permit pivotal movement of the truck segment with respect to the sill plate and car.

15. A means for supporting a car including a sill beneath the car, a sill plate disposed for longitudinal movement beneath the sill, a truck segment operatively engaged to the sill plate, means for preventing the sill from being vertically displaced from the sill plate comprising interfitting guides on the sill plate and sill, and means for cushioning shock between the sill plate and sill comprising resilient members disposed therebetween.

16. A truck for the adjacent cars of an articulated train comprising a two segment truck, the segments being adapted to be connected with each other and each segment of which has wheels supporting it, sills for supporting the cars on the truck segments, sill plates cooperatively engaging the sills, pivots for each truck segment adjacent the line of cleavage between the truck segments for cooperatively engaging the truck segments to the sill plates, and a segmental king pin coupling having the axis substantially at the line of cleavage of the truck segments for cooperatively engaging the sills of said two adjacent cars.

17. A truck for the adjacent cars of an articulated train comprising a two segment truck, the segments being adapted to be connected with each other and each segment of which has wheels supporting it, sills for supporting the cars on the truck segments, sill plates cooperatively engaging the sills, pivots for each truck segment adjacent the line of cleavage between the truck segments for cooperatively engaging the truck segments to the sill plates, and a segmental king pin coupling having the axis substantially at the line of cleavage of the truck segments for cooperatively engaging the sills of said two adjacent cars, said king pin segments having slightly arcuate faces on their axis line.

18. In a truck for articulated cars, a pair of truck segments, means for pivotally engaging the truck segments to the adjacent ends of two cars, means for connecting the truck segments to form a single integrated truck, separate means for connecting the adjacent ends of the two cars, the axis of said car connecting means operating as an effective pivotal center of the integrated truck.

19. In a truck for the cars of an articulated type train, two truck segments, means for pivotally attaching each truck segment to its respective car, said means positioned on adjacent ends of the truck segments to permit a minimum of lateral movement of the extreme end of each car relative to said adjacent end of the supporting truck segment, means for securing the truck segments together to form a single truck, and other means for securing the cars together.

GEORGE T. RONK.